United States Patent
Gao et al.

(10) Patent No.: US 6,898,529 B2
(45) Date of Patent: May 24, 2005

(54) METHOD AND SYSTEM FOR DETERMINING PARAMETERS INSIDE A SUBTERRANEAN FORMATION USING DATA SENSORS AND A WIRELESS AD HOC NETWORK

(75) Inventors: Li Gao, Missouri City, TX (US); Bruce H. Storm, Jr., Houston, TX (US); Lewis Norman, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 10/657,018

(22) Filed: Sep. 5, 2003

(65) Prior Publication Data

US 2005/0055162 A1 Mar. 10, 2005

(51) Int. Cl.[7] .............................................. G06F 19/00
(52) U.S. Cl. ....................................... 702/11; 702/13
(58) Field of Search .............................. 702/5, 6, 9, 11, 702/12, 13, 14

(56) References Cited

U.S. PATENT DOCUMENTS

| | | | | |
|---|---|---|---|---|
| 5,276,655 A | * | 1/1994 | Rialan et al. | 367/77 |
| 5,652,717 A | * | 7/1997 | Miller et al. | 703/6 |
| 5,724,241 A | * | 3/1998 | Wood et al. | 702/14 |
| 5,808,916 A | * | 9/1998 | Orr et al. | 703/6 |
| 5,822,273 A | * | 10/1998 | Bary et al. | 367/77 |
| 5,991,602 A | | 11/1999 | Sturm | 455/455 |
| 6,023,223 A | * | 2/2000 | Baxter, Jr. | 340/531 |
| 6,117,643 A | * | 9/2000 | Simpson et al. | 435/7.1 |
| 6,169,476 B1 | * | 1/2001 | Flanagan | 340/286.02 |
| 6,252,544 B1 | * | 6/2001 | Hoffberg | 342/357.1 |
| 6,285,955 B1 | * | 9/2001 | Goldwasser | 702/6 |
| 6,443,228 B1 | | 9/2002 | Aronstam et al. | 166/166 |
| 6,519,568 B1 | * | 2/2003 | Harvey et al. | 705/1 |
| 6,751,553 B2 | * | 6/2004 | Young et al. | 702/5 |
| 2003/0205376 A1 | * | 11/2003 | Ayoub et al. | 166/254.2 |

OTHER PUBLICATIONS

U.S. Appl. No. 60/374,217, filed Apr. 19, 2002.*

* cited by examiner

*Primary Examiner*—Donald McElheny, Jr.
(74) *Attorney, Agent, or Firm*—Robert A. Kent; Paul R. Morico

(57) ABSTRACT

The present invention is directed to a method and system for determining parameters inside a subterranean formation. In accordance with the present invention, a plurality of wireless data sensors are injected into the pores or fractures of a subterranean formation. The data sensors includes sensors that record parameters such as temperature, pressure and certain time stamps. Either autonoumously or upon command from a data interrogator tool located down hole, the plurality of data sensors form a wireless ad hoc network and telemeter the recorded data back to the data interrogator tool, which in turn communicates the data to a microprocessor located at the surface. Based on these data, the spatial distribution of the sensors and formation parameters such as temperature and pressure at each data sensor inside the subterranean formation can be obtained.

26 Claims, 4 Drawing Sheets

METHOD AND SYSTEM FOR DETERMINING PARAMETERS INSIDE A SUBTERRANEAN FORMATION USING DATA SENSORS AND A WIRELESS AD HOC NETWORK

BACKGROUND OF THE INVENTION

The present invention relates to methods for determining the parameters inside of a subterranean formation, and more specifically to the use of data sensors and wireless ad hoc networks to determine the parameters inside subterranean formations.

Very often the subterranean formation into which a well has been drilled needs to be treated before hydrocarbons can be recovered from the formation. Depending upon the nature of the formation, different types of treatments may be employed. Usually, however, the subterranean formation has to be fractured, i.e., cracks need to be formed into the formation to facilitate flow of the hydrocarbons. There are several different methods that may be employed to fracture the formation depending upon the nature of the formation. One fracturing method involves pumping an acid-based fluid into the formation such as hydrochloric acid, which can hydraulically fracture the formation, and also dissolve away acid soluble rock which is present. Fracturing acidizing is used on formations with a high degree of acid soluble minerals, typically carbonates. Typically fracturing acidizing is used as stimulation option on formations with greater than 50% acid solubility.

Another fracturing method involves introducing a high pressure non-acid-based fluid into the formation through the well bore. The high pressure fluid opens up the pores and cracks in the formations. Generally, once a hydraulic fracture is induced and propagated, release of pressure will result in the fracture closing and not maintaining a highly conductive passage way for hydrocarbon production. Proppants are mixed in the fluid and pumped into the fracture to keep the fracture at least partly open after the "frac job." The proppants permanently increase the permeability of the formation and thus enhance recovery of the hydrocarbons. The proppants are designed such that they are mechanically capable of withstanding the stress exerted on them by the formation and are able to hold open the fracture. Typically proppants are prepared from very round sands, ceramics, and sintered bauxite with the particle size being from 100–1000 microns in diameter.

However, the actual geometry (length, width, height) of such a frac job is not known and is only indirectly inferred from production data collected after production has commenced. In order to correctly gauge the effectiveness of a frac job, it is desirable that the physical environment of the fractures be well understood. To this end, it is desirable to be able to measure the temperature, pressure and other physical properties in the fractures opened up by the high pressure fluid. It is also desirable to have knowledge about the extent of the fractures. Having this information before production commences can enable the well operators to optimize drainage to hydrocarbon reservoirs and thereby improve recovery.

Furthermore, knowing the temperature, pressure and other physical properties of the subterranean formation before the fractures are even formed is extremely useful. This information can be used to determine what type of subterranean formation is present and therefore can be informative of the type of frac job to run, e.g., whether an acid or non-acid based fracture fluid should be used and whether or not proppants should be employed. To obtain such data, however, remote measurement devices need to be placed within the subterranean formation. This presents several challenges to existing technology. One such challenge is placing the measurement devices into the subterranean formation. The other is establishing a communication network capable of transmitting the data from the subterranean formation to the surface.

Conventional communication methods, such as an electric wire or optical fiber, are not easily adaptable to collect data from remote locations such as subterranean formations. Existing techniques make it difficult to feed electric wires or optical fibers into the formations. At least one system has been proposed to establish communication between the downhole equipment of a deep drilling tool and the surface by sending mechanical pulses through the drilling fluid in the well. While such systems may permit communication between the downhole device and the surface, such systems are not useable for gathering data from fractures in the subterranean formation itself. Furthermore, the communication rates of such systems are extremely slow.

Another system has also been proposed, which purports to communicate data from remote locations in a well bore more quickly. This system employs a plurality of remotely readable, erasable and writable data carriers capable of flowing in a fluid that can be pumped down hole. The data carriers flow between two points in the well bore. As the data carriers pass the first point, data is remotely written to the data carriers. As the data carriers pass the second point, data is remotely read from the data carriers. In such a system, data can be communicated to the surface at a rate determined by the fluid flow rate in the well bore. Such a system cannot be used to gather data in the pores or cracks in a formation, however, because solid devices cannot be readily circulated in and out of the formation.

Another system has been proposed, which also employs flowable devices to communicate between the surface and downhole instruments as well as measure downhole parameters of interest. When the flowable devices act has a measurement device, they take the measurements, such a temperature, pressure, flow rate, etc., at one or more locations in the well bore. The flowable devices then flow back to the surface with the drilling fluid, where they are retrieved. The measurement information obtained by the flowable devices is then retrieved for use and analysis. While such a system may be useful in obtaining parameters within the well bore, it cannot be utilized in taking measurements within the pores or cracks of a formation. This is because the system relies on circulating the flowable devices along the well bore to collect the data. It is not convenient to recirculate such flowable devices into the formation and then back to the surface.

SUMMARY OF THE INVENTION

The present invention provides a method of determining the parameters inside of a subterranean formation using data sensors and ad hoc networks, which meet the needs described above and overcome the deficiencies of the prior art.

In one embodiment of the present invention, a method of determining parameters inside of a subterranean formation is provided. The method comprises the steps of assigning an identification number to each data sensor of a plurality of wireless data sensors, introducing the plurality of data sensors into pores or fractures in the subterranean formation and communicating certain data from each data sensor to a data interrogator tool. Either autonomously or upon command from the data interrogator tool, the plurality of data sensors form an ad hoc network and telemeter data recorded by each data sensor back to the data interrogator tool. The data recorded might include temperature, pressure, time stamps or other data which can be utilized to infer the locations of a plurality of data sensors.

In another embodiment of the present invention, a data collection and processing system for determining parameters inside of a subterranean formation is provided. The system includes the plurality of wireless data sensors, which are adapted for injection into the pores or fractures of the subterranean formation; the data interrogator tool, which is in data communication with the plurality of wireless data sensors; and a data processor, which is in data communication with the data interrogator tool. The data interrogator tool is preferably located down hole in a well bore formed within the subterranean formation and the data processor is preferably located at the surface.

It is, therefore, a general object of the present invention to provide a method and system for determining parameters inside of a subterranean formation using data sensors and ad hoc networks.

Other and further objects, features and advantages of the present invention will be readily apparent to those skilled in the art upon a reading of the description of preferred embodiments which follows.

BRIEF DESCRIPTION OF THE DRAWINGS

The present invention is better understood by reading the following description of non-limitative embodiments with reference to the attached drawings wherein like parts of each of the several figures are identified by the same reference characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1:
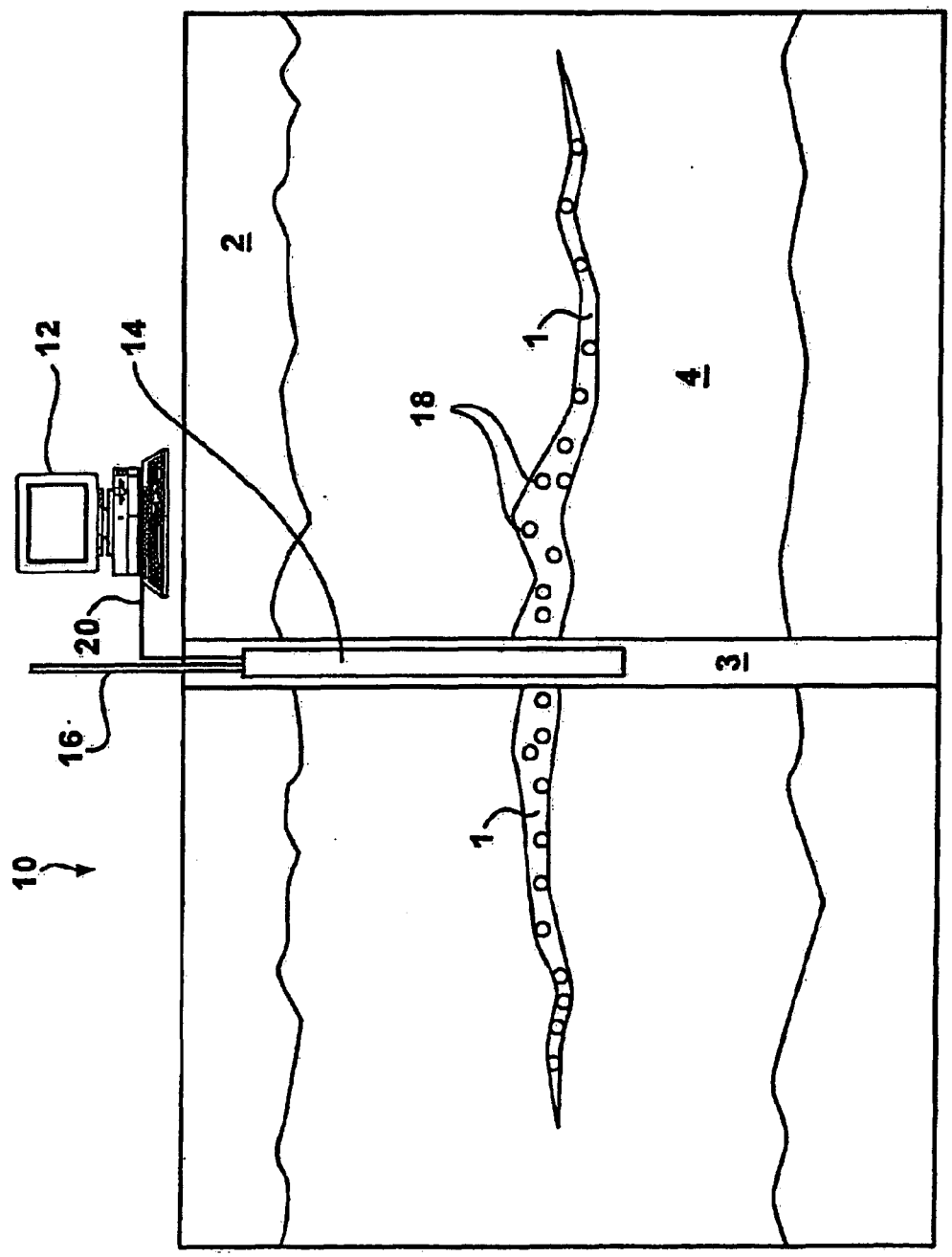
FIG. 1 is a schematic diagram of a system for determining parameters inside fractures of a subterranean formation according to the present invention.

The details of the present invention will now be discussed with reference to the Figures. Turning to FIG. 1, a data collection and processing system for determining parameters inside fractures 1 of a subterranean formation 2 is illustrated generally by reference numeral 10. The system 10 includes a data processor 12, which may be a personal computer (PC) or other similar data processing device. The system 10 further includes a data interrogator tool 14, which is lowered down hole into a well bore 3 formed within the subterranean formation 2 using a drill or work string 16. The system 10 further comprises a plurality of flowable discrete data sensors 18, which may be mixed with conventional proppants and pumped down hole into the pores or fractures 1 of the subterranean formation 2 in the region believed to contain the desired hydrocarbons, i.e., the productive zone 4.

The data interrogator tool 16 is connected to the PC via a wire line 20 or other telemetry device such as an electromagnetic telemetry device or an acoustic telemetry device. In one embodiment, the data interrogator tool 16 has an RF energy source incorporated into its internal circuitry, as further discussed below.

The data sensors 18 are preferably made of MEM (micro-electro-mechanical) sensors and are sized to fit within the pores or fractures 1 of the subterranean formation 2. Such sensors are also preferably programmed to store a unique identification number and to record time. They may also be capable of measuring certain parameters within the subterranean formation such as temperature and pressure. Thus, as used herein, the phrase "data sensors" is intended to encompass devices that are capable of storing and communicating data only as well as devices that are capable of storing, measuring and communicating data.

The data processor 12 can be programmed to calculate the position of each data sensor inside of the fracture once each data sensor's unique identification number and certain time stamp data is known. For example, if each data sensor communicates to at least one adjacent data sensor its unique identification number and a time stamp and the adjacent data sensor in turn communicates its unique identification number and a time stamp as well as the unique identification number and time stamp of the first data sensor to a third data sensor and that process is repeated for each data sensor, it is possible to map out the location of the data sensors, using an algorithm comprising a triangulation routine or other known equivalent calculation routine. Using such a method, one can estimate the range of the fracture 1.

Each of the data sensors 18 preferably has a built-in network capability. The data sensor 18 may be self energized or passively energized with energy from the data interrogator tool 14 or other energy source found inside the well bore 3. Upon command from the interrogator tool, or autonomously, the data sensors from ad hoc network and telemeter the measured data and/or time stamp data in each data sensor back to the data interrogator tool 14 inside well bore 3. The data is then in turn communicated via the wireline 20 to the PC 12, which processes the data into the desired parameter information.

Figure 3:
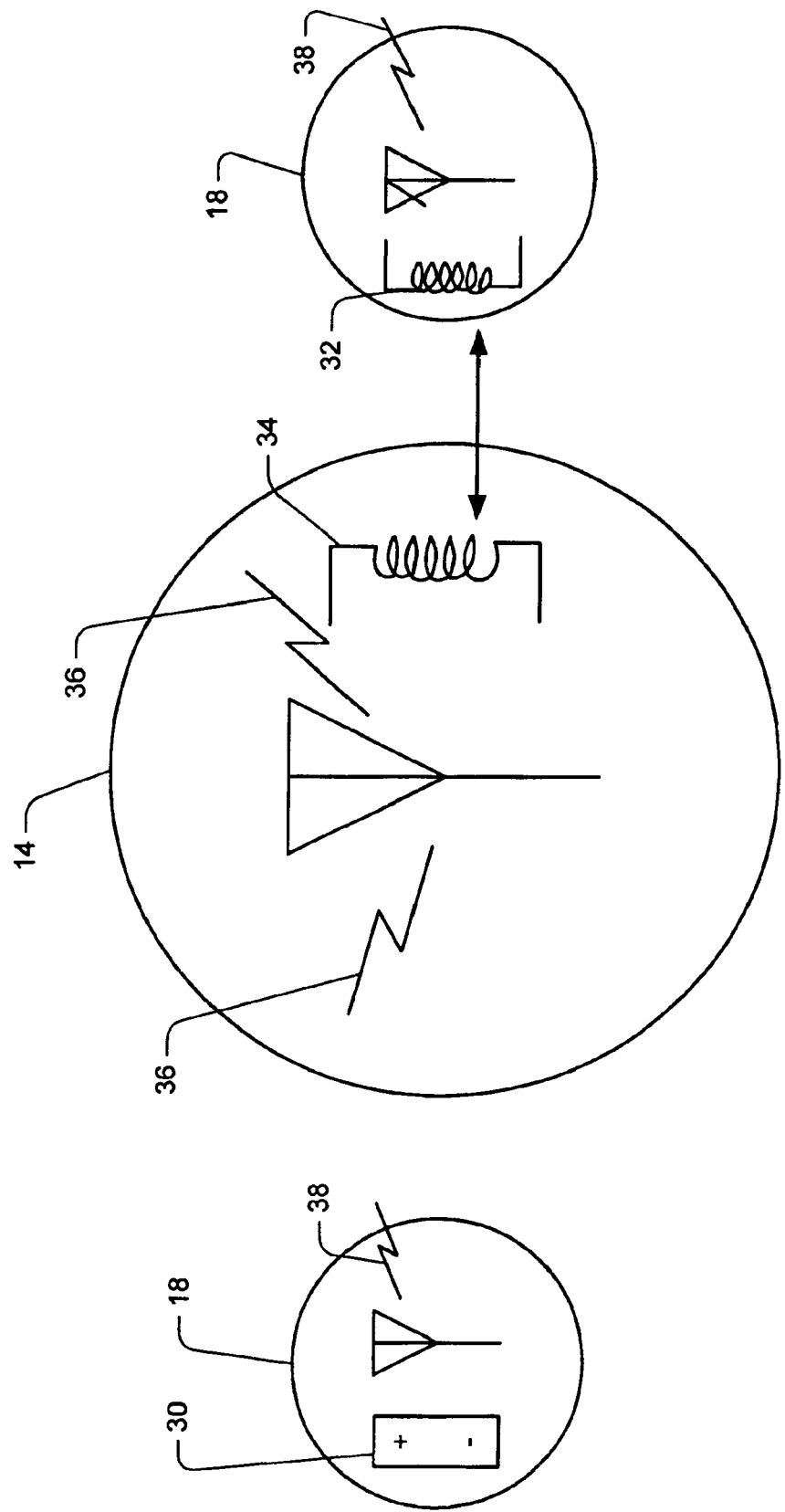
FIG. 3 is a schematic diagram illustrating the internal components of the data interrogator tool and one of the data sensors.

More specifically, the temperature, pressure and other sensors on the data sensors 18 can be made of MEMS devices that can withstand the harsh downhole environment. These devices can be self energized using on-board batteries 30 (shown in FIG. 3), which can be thin-film batteries, micro-nuclear batteries, and other energy sources. Alternatively, they can be passively energized, e.g., using an RF antenna 32 (shown in FIG. 3), which can pick up energy from the RF energy source 34 lowered into the well bore 3 as part of the data interrogator tool 14. Since the oil/gas bearing zones have high value of resistivity, RF energy can potentially penetrate into the formation.

Figure 2:
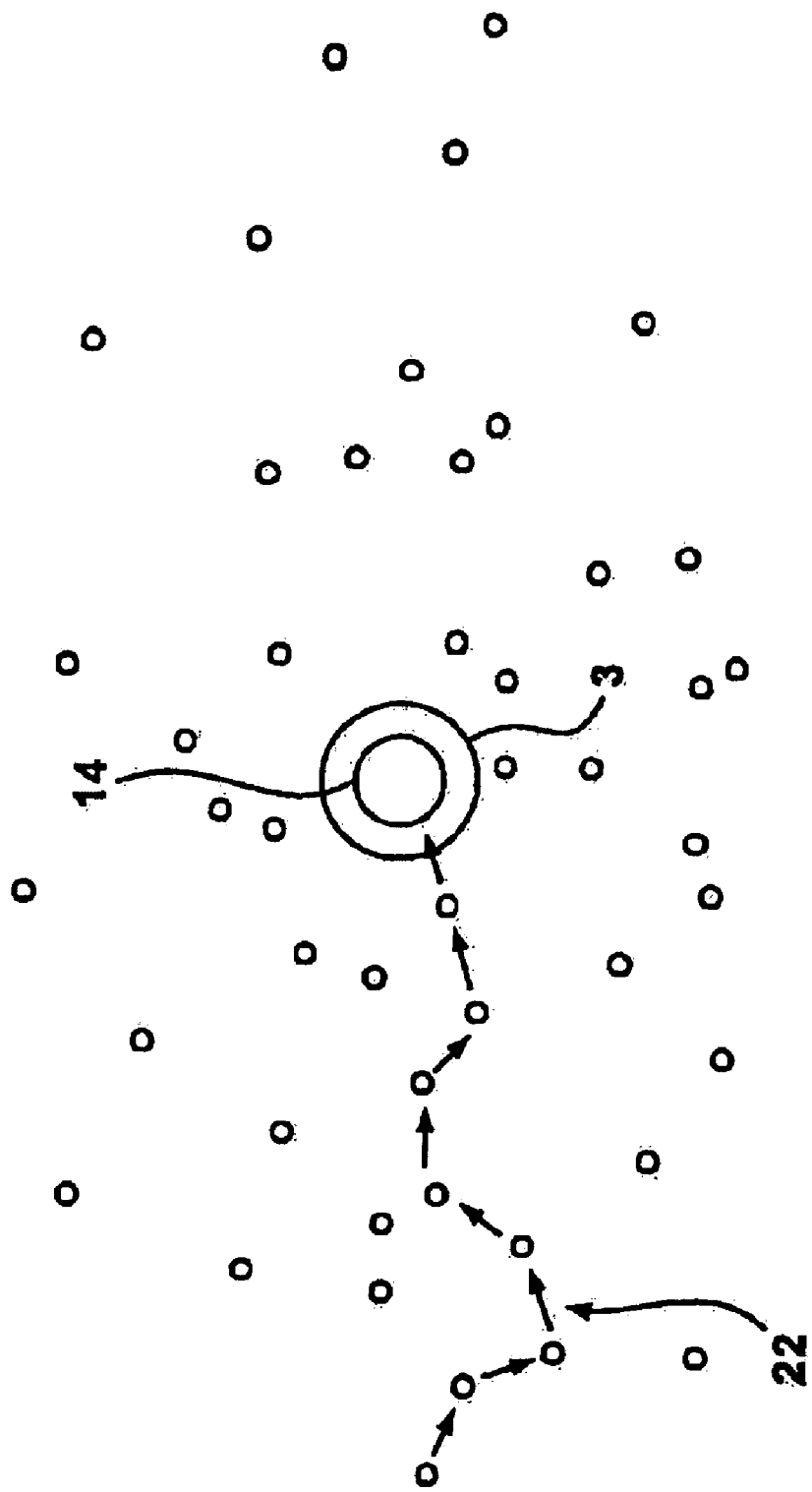
FIG. 2 illustrates the interaction of a data interrogator tool and plurality of flowable discrete data sensors in accordance with the present invention.

The measured environmental data can either be stored on an on-board memory or be telemetered to the data interrogator tool 14 in the well bore 3 via an ad hoc network formed by the plurality of data sensors 18 scattered inside the fracture. The ad hoc network is necessary since the range of transmission for the data sensor can potentially be much less than the distance from the data sensor to the data interrogator tool 14 inside the wellbore. Therefore, it is necessary for each data sensor to communicate with its closest neighbors. In this fashion, an ad hoc network path 22 is formed and data can then be telemetered from positions away from the well bore 3 to the data interrogator tool 14 inside the well bore 3, as illustrated in FIG. 2.

To incorporate network compatibility, the plurality of data sensors 18 may be built with ROC (Radio-On-Chip) network technology.

In an alternate embodiment, one may put a time stamp in the memory of a data sensor as it leaves the well bore 3. Another time stamp may then be put in the memory when the sensor stops moving in the fracture. This may be accomplished, e.g., using on-board inertial MEMS sensors. When the data interrogator tool 14 requests data from the data sensor, both time stamps are telemetered via the ad hoc network and sent to the data interrogator tool. If the flow rate of the high pressure fracture fluid is known, the extent of the fracture can be estimated. This method will produce a rough map of the fracture. However, a more accurate map can be generated using the triangulation method.

Figure 4:
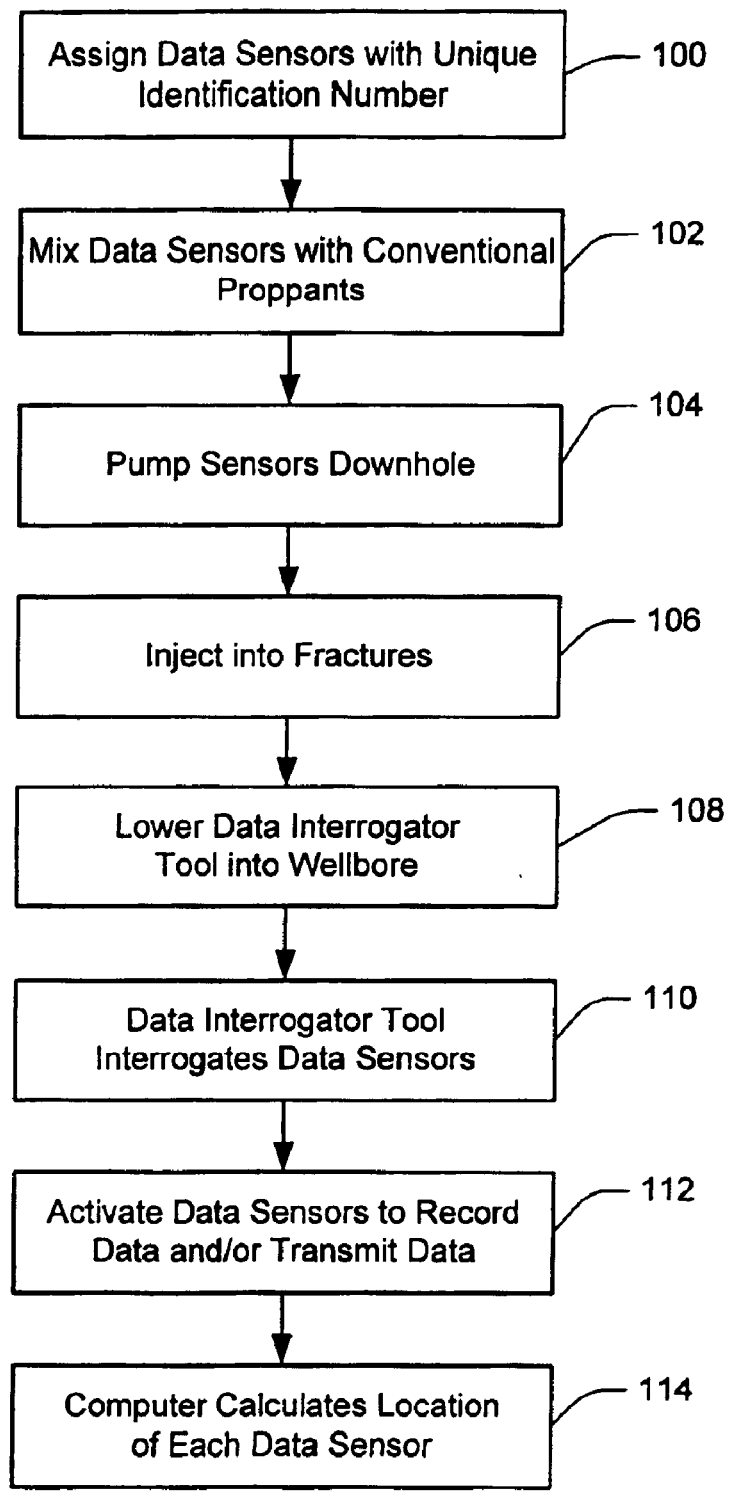
FIG. 4 is a flowchart illustrating an embodiment of a method in accordance with the present invention.

In another aspect of the present invention, a method is provided for determining parameters inside pores or fractures 1 of the subterranean formation using the data sensors 18 and wireless ad hoc network. In step 100 of the preferred method, the plurality of flowable discrete data sensors are assigned a unique identification number, as illustrated in FIG. 4. In step 102, the sensors are mixed with conventional proppants and in step 104 the sensors are pumped down hole with the proppants into the well bore 3. In step 106, the data sensors 18 are injected into the fractures 1 of the subterranean formation 2 in the region of the productive zone 4. Alternatively, the data sensors alone can be pumped into the subterranean formation 2 to measure formation properties such as temperature, pressure and their spatial distribution in which case step 102 would not be performed. Such information is then used to aide in the design of an optimal frac job and/or acidizing job.

Furthermore, in step 108 the data interrogator tool 14 is lowered into the well bore 3 also in the region of the productive zone 4. In step 110, the data interrogator tool 14 interrogates the data sensors, e.g., by sending out an RF signal 36 (shown in FIG. 3). In step 112, each data sensor is activated to record certain data and/or transmit that data via signal 38 (shown in FIG. 3) to an adjacent data sensor. In addition to transmitting its own recorded data, each data sensor also preferably transmits the recorded data of at least one other data sensor. It is through a repetition of this sequence that the ad hoc network is formed and the data contained within all of the data sensors is communicated to the data interrogator tool 14, and via the wire line 20 to the computer 12. In step 114, the computer 12 employs an algorithm, such as a triangulation routine, to calculate the location of each data sensor within the subterranean formation.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of determining parameters inside of a subterranean formation comprising the steps of:
   assigning a unique identification number to each data sensor of a plurality of wireless data sensors;
   introducing the plurality of data sensors into a fracture in the subterranean formation; and
   communicating certain data from each data sensor, including its unique identification number, to a data interrogator tool.

2. The method of determining parameters inside of a subterranean formation according to claim 1 further comprising the step of activating each data sensor to measure formation parameters and record data.

3. The method of determining parameters inside of a subterranean formation according to claim 2 wherein the data being recorded includes temperature, pressure and/or any other formation parameter of interest.

4. The method of determining parameters inside of a subterranean formation according to claim 1 further comprising the step of activating each data sensor to communicate its respective certain data to at least one adjacent data sensor.

5. The method of determining parameters inside of a subterranean formation according to claim 4 wherein at least three data sensors are provided.

6. The method of determining parameters inside of a subterranean formation according to claim 5 wherein a first data sensor communicates its unique identification number and a time stamp to a second data sensor and a third data sensor communicates its unique identification number and a time stamp to the second data sensor as well as the unique identification number and time stamp of the first data sensor.

7. The method of determining parameters inside of a subterranean formation according to claim 6 further comprising the step of employing an algorithm to calculate the location of each data sensor within the subterranean formation using the identification number and time stamp data received from each of the data sensors.

8. The method of determining parameters inside of a subterranean formation according to claim 7 wherein the algorithm comprises a triangulation routine.

9. The method of determining parameters inside of a subterranean formation according to claim 1 further comprising the step of interrogating each data sensor for its respective certain data.

10. The method of determining parameters inside of a subterranean formation according to claim 1 further comprising the step of communicating each data sensor's respective certain data to a data processor.

11. The method of determining parameters inside of a subterranean formation according to claim 1 wherein the plurality of data sensors form a wireless ad hoc network and telemeter data from each data sensor back to the data interrogator tool.

12. The method of determining parameters inside of a subterranean formation according to claim 1 further comprising the step of mixing the plurality data sensors with conventional proppants prior to introducing the plurality of data sensors into the subterranean formation.

13. A data collection and processing system for determining parameters inside of a subterranean formation comprising:
   a plurality of wireless data sensors each having a unique identifier adapted for injection into a fracture in the subterranean formation;
   a data interrogator tool, which is in data communication with the plurality of wireless data sensors; and
   a data processor, which is in data communication with the data interrogator tool.

14. The data collection and processing system according to claim 13 further comprising a wireline or other telemetry device that connects the data interrogator tool to the data processor.

15. The data collection and processing system according to claim 13 wherein each of the plurality of data sensors is self-energized.

16. The data collection and processing system according to claim 15 wherein each of the plurality of data sensors comprises one of an on-board thin film battery, micro-nuclear battery or other type of miniature battery.

17. The data collection and processing system according to claim 13 wherein the data interrogator tool is integrated with an RF energy source and each of the plurality of data sensors is passively energized using an RF antenna, which picks up energy from the RF energy source.

18. The data collection and processing system according to claim 13 wherein each of the data sensors comprises a MEMS device.

19. The data collection and processing system according to claim 13 wherein the plurality of data sensors form a wireless ad hoc network and telemeter data recorded by each data sensor back to the data interrogator tool.

20. The data collection and processing system according to claim 13 wherein each of the plurality of data sensors communicates certain data to an adjacent data sensor, including the unique identification number.

21. The data collection and processing system according to claim 20 wherein the certain data communicated to the adjacent data sensor includes data received from at least one other data sensor.

22. The data collection and processing system according to claim 21 wherein at least three data sensors are provided.

23. The data collection and processing system according to claim 22 wherein a first data sensor communicates its unique identification number and a time stamp to a second data sensor and a third data sensor communicates its unique identification number and a time stamp to the second data sensor as well as the unique identification number and time stamp of the first data sensor.

24. The data collection and processing system according to claim 23 wherein the data processor comprises an algorithm that calculates the location of each data sensor within the subterranean formation using the identification number and time stamp data received from each of the data sensors.

25. The data collection and processing system according to claim 24 wherein the algorithm comprises a triangulation routine.

26. The data collection and processing system according to claim 13 wherein the data interrogator tool is located down hole in a well bore formed within the subterranean formation and the data processor is located at the surface.

\* \* \* \* \*